US005704871A

United States Patent [19]
Furukawa et al.

[11] Patent Number: 5,704,871
[45] Date of Patent: Jan. 6, 1998

[54] CONTROL SYSTEM FOR SLIPPING AT LEAST ONE CLUTCH INSTEAD OF SLIPPING A LOCKUP CLUTCH AFTER A SHIFT IN A HYDRAULICALLY OPERATED VEHICLE TRANSMISSION

[75] Inventors: Hideo Furukawa; Tatsuyuki Ohashi, both of Wako, Japan

[73] Assignee: Honda Giken Kogyo Kabushiki Kaisha, Tokyo, Japan

[21] Appl. No.: 610,064

[22] Filed: Feb. 29, 1996

[30] Foreign Application Priority Data

Mar. 2, 1995 [JP] Japan .................. 7-068759

[51] Int. Cl.⁶ .......................... F16H 59/38; B60K 41/22
[52] U.S. Cl. .......................... 477/62; 477/64; 477/110; 477/174
[58] Field of Search .................. 477/62, 64, 65, 477/166, 174, 175, 176, 181, 156, 158, 107, 109, 110

[56] References Cited

U.S. PATENT DOCUMENTS

| 4,984,484 | 1/1991 | Fujiwara et al. ............. | 477/156 X |
| 5,403,250 | 4/1995 | Juergens .................... | 477/174 X |
| 5,577,980 | 11/1996 | Vukovich et al. ............ | 477/156 X |

FOREIGN PATENT DOCUMENTS

| 62-147153 | 7/1987 | Japan. |
| 62-224765 | 10/1987 | Japan. |
| 62-242173 | 10/1987 | Japan. |
| 62-255662 | 11/1987 | Japan. |

*Primary Examiner*—Khoi Q. Ta
*Attorney, Agent, or Firm*—Armstrong, Westerman, Hattori, McLeland & Naughton

[57] ABSTRACT

A vehicle automatic transmission control system in which the clutch is controlled in a slipping state if a torque converter is locked up when the gear shift command is not output. When the engine speed fluctuates, the fluctuations pass through the transmission and wheels and act on the ground to produce a reaction which passes back through the wheels and vehicle body and acts on the passengers as surging. In the prior art, this surging is prevented by slip-controlling the lockup clutch. This complicates the hydraulic control circuit. In the subject control, therefore, the clutch is slip-controlled even when no gearshift is in progress so as to absorb surging by slipping the clutch, not by the torque converter as in the prior art. As a result, it suffices to control the lockup clutch L of the torque converter between only two positions, one for complete lockup and one for complete release, rendering the structure of the hydraulic control circuit simple.

6 Claims, 4 Drawing Sheets

CONTROL SYSTEM FOR SLIPPING AT LEAST ONE CLUTCH INSTEAD OF SLIPPING A LOCKUP CLUTCH AFTER A SHIFT IN A HYDRAULICALLY OPERATED VEHICLE TRANSMISSION

BACKGROUND OF THE INVENTION

1. Field of the Invention

This invention relates to a control system for a hydraulically operated vehicle transmission.

2. Description of the Prior Art

As taught by Japanese Laid-Open Patent Application Nos. Sho 62(1987)-147153 and Sho 62(1987)-224765, it is a known practice to prevent shock during gearshift in a vehicle equipped with a hydraulically operated transmission by providing the hydraulic control circuit for controlling the oil pressure of the transmission's clutches, brakes and other frictional engagement elements with a linear solenoid, duty solenoid or other such solenoid valve. In the prior art systems, the oil pressure of the frictional engagement elements is controlled by determining the current supply to the solenoid valve based on parameters indicative of gearshift progress, such as the rotational speed of the transmission input shaft, engine speed and the output shaft torque.

Although the solenoid valve of the prior art systems operates during gearshift, it plays only a small role when gearshift is not in progress, as can be seen from the fact that at such times it is either limited to generating an oil pressure corresponding to the degree of throttle opening or its current supply is cut off to save power.

The hydraulically operated vehicle transmission is equipped with a torque converter which transfers power from the power source (the internal combustion engine) to the gear unit. Since the torque converter is generally of the hydraulic power transmission element, it cannot maintain good efficiency across the full range of driving conditions. It is therefore provided with a lockup clutch which directly couples its input and output sides so as to prevent lowering of fuel economy in the region in which efficiency decreases.

Although keeping the lockup clutch in operation as much as possible is preferable from the point of fuel economy, doing so maintains the output shaft of the engine in direct mechanical connection with the input shaft of the transmission. In situations where engine output fluctuation is a problem, therefore, the engaging force of the lockup clutch, i.e., the degree of clutch lockup, cannot be increased because to do so would result in surging owing to the variation in the engine rotation. To cope with this problem, Japanese Laid-Open Patent Application Nos. Sho 62(1987)-242173 and Sho 62(1987)-255662 propose releasing the lockup clutch under such circumstances or enabling the hydraulic control circuit for the lockup clutch to control in slip engagement and controlling the amount of slip based on, for example, the ratio or difference between the input and output speeds of the torque converter.

The technologies set out in these prior art references are, however, disadvantageous in the points that they require a more complicated hydraulic control circuit and increase both the cost and the weight of the system. Although a simpler solution has been desired, one has been difficult to develop owing to the conflicting requirement of maintaining and improving fuel economy.

SUMMARY OF THE INVENTION

An object of this invention is therefore to overcome the aforesaid problems of the prior art by providing a control system for a hydraulically operated vehicle transmission which achieves a simplification of the hydraulic control circuit while enabling surging to be eliminated without degrading fuel economy and which also increases the utilization efficiency of the solenoid valves.

Another object of the invention is to provide a control system for a hydraulically operated vehicle transmission which achieves a simplification of the hydraulic control circuit without degrading fuel economy and which also increases the utilization efficiency of a solenoid valve by also using the solenoid valve for controlling the lockup clutch when gearshift is not in progress.

This invention achieves these objects by providing a system for controlling a hydraulically operated vehicle transmission, comprising vehicle operating condition detecting means for detecting parameters indicative of operating conditions of the vehicle, gearshift command output means for determining a gear ratio to be shifted to based on the detected parameters, to output a gearshift command, a plurality of frictional engaging elements for selectively establishing one gear stage in the transmission, and hydraulic pressure regulating means for regulating a supply of hydraulic fluid to said frictional engaging elements. In the system, said hydraulic pressure regulating means includes discriminating means for discriminating whether the gear shift command is not output, and slip control means for controlling at least one of said frictional engaging elements in a slipping state when the gear shift command is not output.

BRIEF EXPLANATION OF THE DRAWINGS

The foregoing and other objects and advantages of the invention will be more apparent from the following description and drawings, in which.

DETAILED DESCRIPTION OF THE PREFERRED EMBODIMENTS

An embodiment of the invention will now be explained with reference to the attached drawings.

Figure 1:
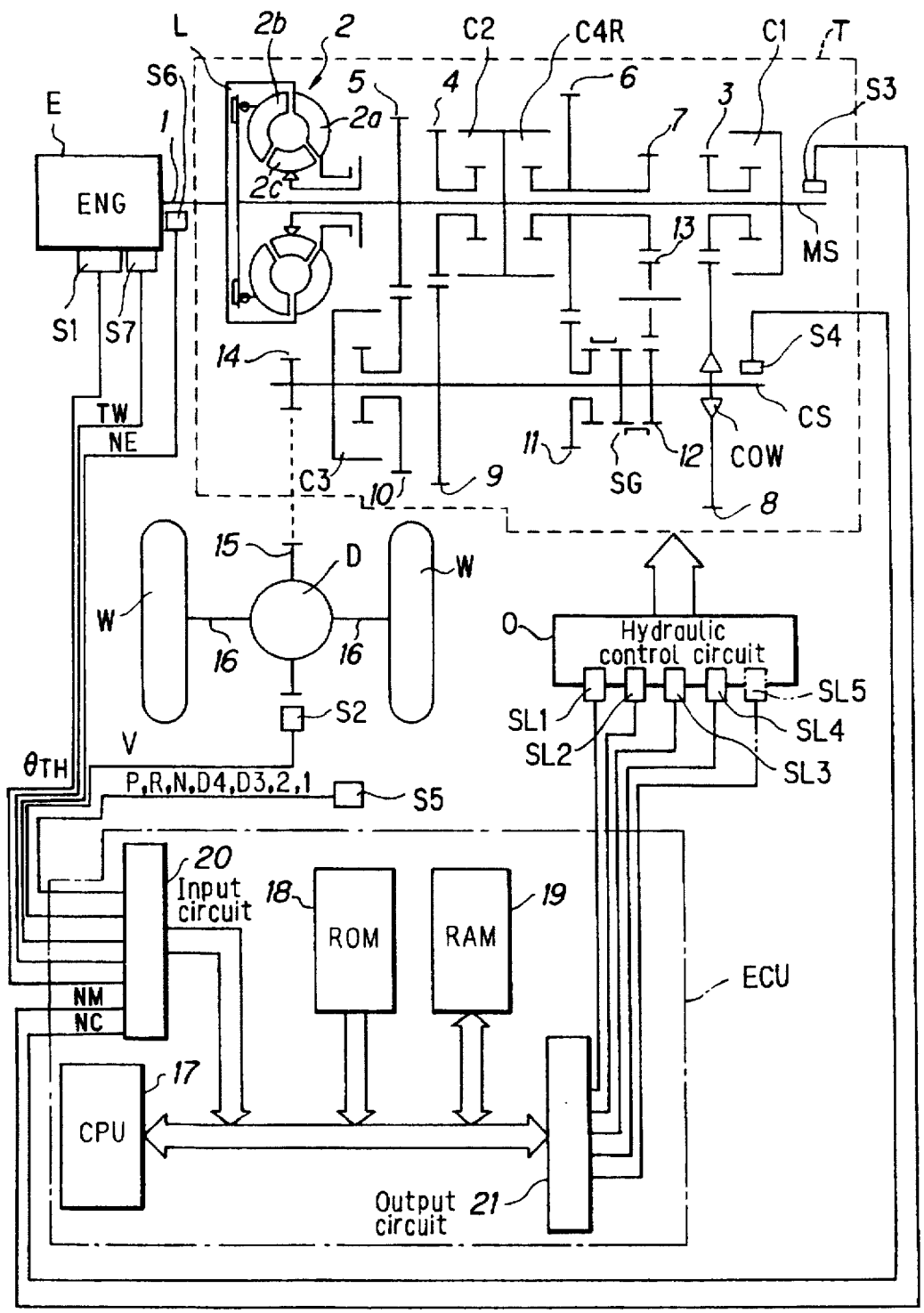
FIG. 1 is an overall view of a control system for a hydraulically operated vehicle transmission.

FIG. 1 is an overall view of the hydraulic pressure control system for a hydraulically operated vehicle transmission according to the invention.

As shown in FIG. 1, a vehicle automatic transmission T is equipped with a main shaft MS connected with a crankshaft 1 of an internal combustion engine E through a torque converter (hydraulic torque converter) 2 having a lockup clutch (lockup means) L and with a countershaft CS connected with the main shaft MS through multiple gear trains.

The main shaft MS supports a main first-speed gear 3, a main second-speed gear 4, a main third-speed gear 5, a main fourth-speed gear 6 and a main reverse gear 7. The countershaft CS supports a counter first-speed gear 8 engaged with the main first-speed gear 3, a counter second-speed gear 9 engaged with the main second-speed gear 4, a counter third-speed gear 10 engaged with the main third-speed gear 5, a counter fourth-speed gear 11 engaged with the main fourth-speed gear 6 and a counter reverse gear 12 engaged with the main reverse gear 7 through a reverse idle gear 13.

The first gear (gear ratio or gear stage) is established when the main first-speed gear 3 rotatably supported on the main shaft MS is connected with the main shaft MS by a first-speed hydraulic clutch C1. Since the first-speed hydraulic clutch C1 is also maintained in the engaged state during establishment of the second-fourth gears, the counter first-speed gear 8 is supported by a one-way clutch COW. The second gear is established when the main second-speed gear 4 rotatably supported on the main shaft MS is connected with the main shaft MS by a second-speed speed hydraulic clutch C2. The third gear is established when the counter third-speed gear 10 rotatably supported on the countershaft CS is connected with the countershaft CS by a third-speed hydraulic clutch C3.

The fourth gear is established when the counter fourth-speed gear 11 rotatably supported on the countershaft CS is connected with the countershaft CS by a selector gear SG and with this state maintained the main fourth-speed gear 6 rotatably supported on the main shaft MS is connected with the main shaft MS by a fourth-speed reverse hydraulic clutch C4R. The reverse gear is established when the counter reverse gear 12 rotatably supported on the countershaft CS is connected with the countershaft CS by the selector gear SG and with this state maintained the main reverse gear 7 rotatably supported on the main shaft MS is connected with the main shaft MS by the fourth-speed reverse hydraulic clutch C4R. The clutches C1, C2, C3 and C4R are the aforesaid frictional engaging elements.

The rotation of the countershaft CS is transmitted through a final drive gear 14 and a final driven gear 15 to a differential D, from where it is transmitted to driven wheels W, W through left and right drive shafts 16, 16.

A throttle position sensor S1 is provided in an air intake pipe (not shown) of the engine E at a point in the vicinity of a throttle valve (not shown) for detecting the degree of opening or position θTH of the throttle valve. A vehicle speed sensor S2 for detecting the vehicle traveling speed V from the rotational speed of the final driven gear 15 is provided in the vicinity of the final driven gear 15. A transmission input shaft speed sensor S3 is provided in the vicinity of the main shaft MS for detecting the rotational speed NM of the transmission input shaft from the rotation of the main shaft MS, and a transmission output shaft speed sensor S4 is provided in the vicinity of the countershaft CS for detecting the rotational speed Nc of the transmission output shaft from the rotation of the counter-shaft CS.

A shift lever position sensor S5 is provided in the vicinity of a shift lever (not shown) installed on the vehicle floor near the driver's seat. The shift lever position sensor S5 detects which of the seven positions P, R, N, D4, D3, 2, and 1 has been selected by the driver. A crank angle sensor S6 is provided in the vicinity of the crankshaft 1 of the engine E for detecting the engine speed NE from the rotation of the crankshaft 1, and a coolant temperature sensor S7 for detecting the engine coolant temperature TW is provided at an appropriate location on a cylinder block (not shown) of the engine E. Outputs of the sensors S1, etc., are sent to an ECU (electronic control unit).

The ECU is constituted as a microcomputer comprising a CPU (central processing unit) 17, a ROM (read-only memory) 18, a RAM (random access memory) 19, an input circuit 20 and an output circuit 21. The outputs of the sensors S1, etc., are input to the microcomputer through the input circuit 20. The CPU 17 of the microcomputer determines the gear (gear ratio) and energizes/deenergizes shift solenoids SL1, SL2 of a hydraulic (pressure) control circuit O via the output circuit 21 so as to switch shift valves (not shown) and thereby engage/disengage the hydraulic clutches of pre-scribed gears, and controls the clutch hydraulic pressure through a linear solenoid SL3. The CPU 17 also controls the operation of the lockup clutch L of the torque converter 2 via a control solenoid SL4.

The torque converter 2 comprises a pump 2a connected to the crankshaft 1, a turbine 2b connected to the main shaft MS, a stator 2c and the lockup clutch L. The lockup clutch L is of the known configuration comprising a lockup piston, a damper spring, etc. Depending on the amount of oil pressure supplied to its left and right chambers, the lockup clutch assumes the ON state (shown by solid lines in FIG. 2 discussed below), the OFF state (shown by phantom lines in FIG. 2) or the slip-controlled state.

When the lockup clutch is ON, the power of the engine E is transmitted to the main shaft MS through a drive plate, a torque converter cover and the lockup clutch L. When the lockup clutch is OFF, the engine power is transmitted to the main shaft MS through the drive plate, the torque converter cover, the pump 12a and the turbine 12b.

Figure 2:
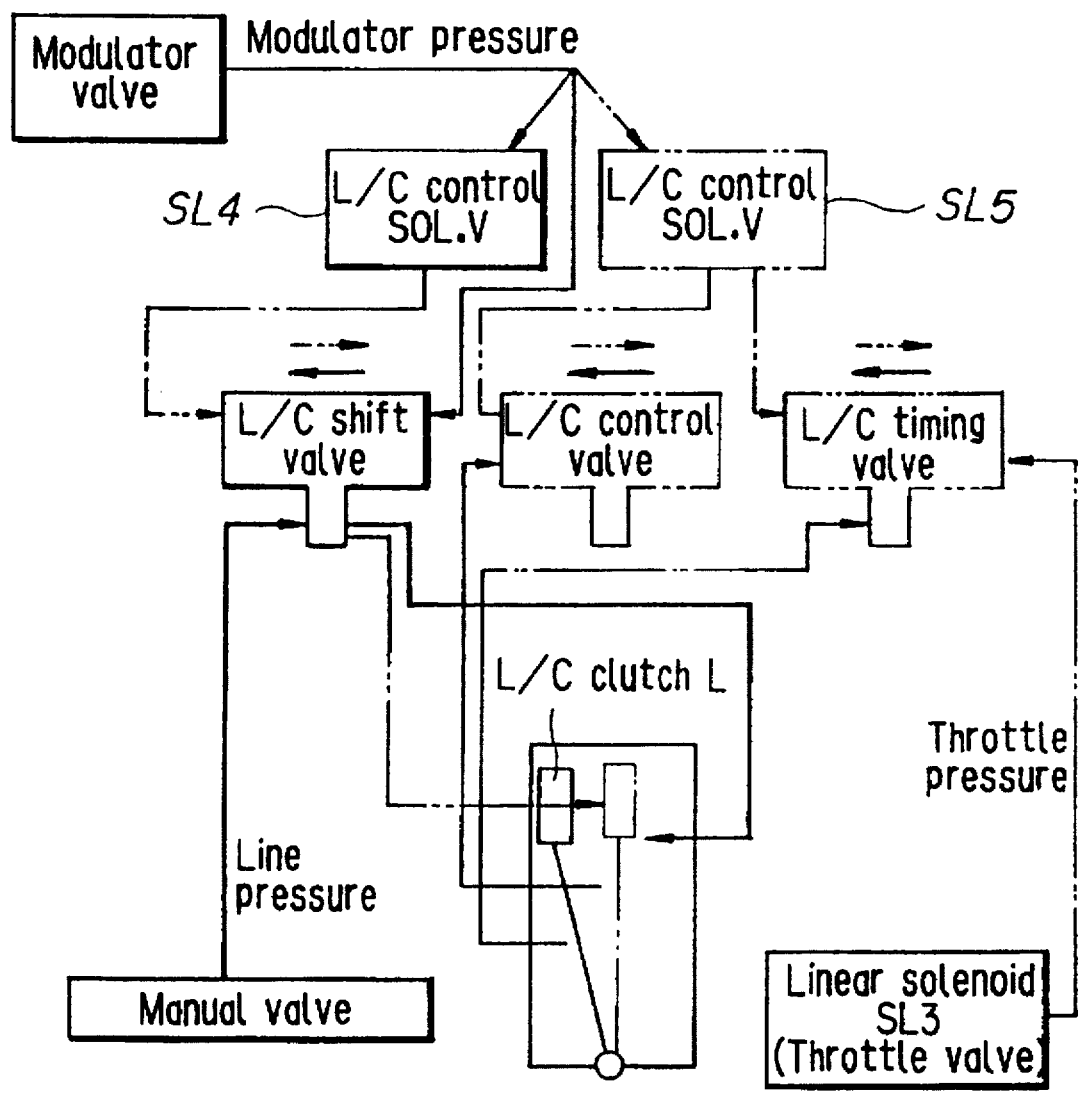
FIG. 2 is a block diagram functionally illustrating the hydraulic operation of the lockup clutch illustrated in FIG. 1.

FIG. 2 is a block diagram functionally illustrating the hydraulic operation of the lockup clutch L. The lockup clutch is engaged/disengaged by supplying or not supplying line pressure from a manual valve to a lockup shift valve which receives modulator pressure from a modulator valve through the solenoid SL4.

The operation of the system will now be explained with reference to the flowchart of FIG. 3. This routine is activated at regular time intervals whenever the engaging force of the lockup clutch is at a high level ensuring complete lockup.

First, in S10, it is checked whether the current routine cycle is the first cycle following completion of a gearshift. When the result in S10 is YES, the program goes to S12, in which a clutch pressure control value QJUA is initially set to a value corresponding to a (torque) capacity equal to about 1.2 times the engine torque (QET×1.2) calculated based on the throttle opening and the engine speed, and to S14, in which a flag F.GST (initial value 0; explained later) is set to 1 and a PI correction term QPI of a PI controller is set to 0. Next, in S16, the clutch pressure control value QJUA is determined as shown. Since the PI correction term QPI was set to 0, the control value set in S12 is used without modification as the control value in the current cycle. The clutch pressure control value QJUA is the manipulated variable for the linear solenoid SL3, specifically the duty ratio in the pulse-width modulation control.

Figure 3:
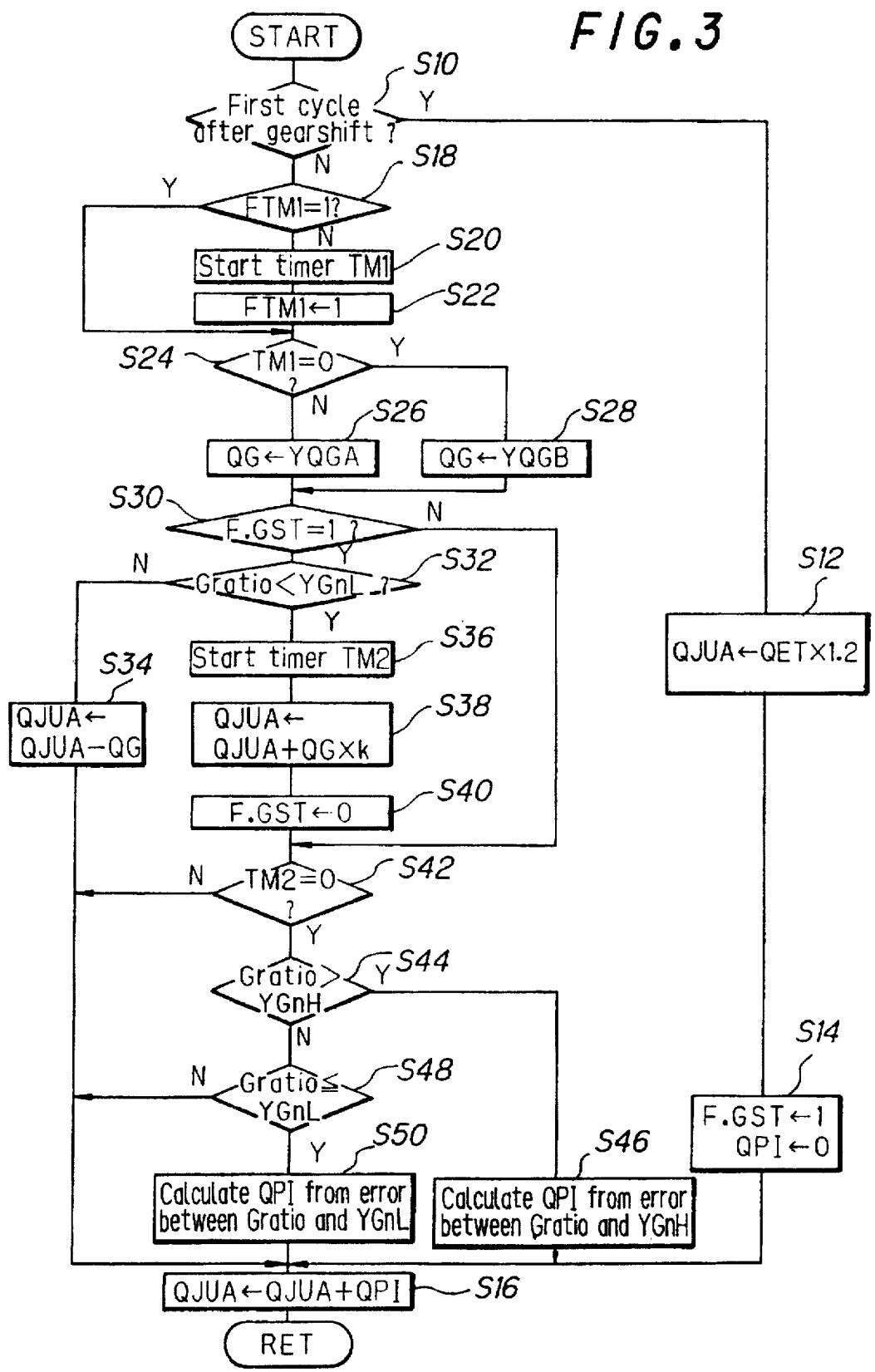
FIG. 3 is a flowchart showing the operation of the system illustrated in FIG. 1.

The explanation of the remainder of flowchart of FIG. 3 will be preceded by a general outline of the control according to this invention.

When the engine speed fluctuates, the fluctuations pass through the transmission and wheels and act on the ground to produce a reaction which passes back through the wheels and vehicle body and acts on the passengers as surging. In the prior art, this surging, which is strongest when the lockup clutch is completely locked up, is prevented by slip-controlling the lockup clutch between the completely locked-up state and the completely released state. This complicates the hydraulic control circuit.

In the control according to the invention, therefore, one of the hydraulic clutches C1, C2, C3, C4R which establishes the gear concerned (the hydraulic clutch Cn) is slip-controlled even when no gearshift is in progress (no gear-shift command is output). In other words, it was considered by the inventors that surging was absorbed by slipping the oil pressure clutch, not by the torque converter as in the prior art. As a result, it suffices to control the lockup clutch L of the torque converter between only two positions, one for complete lockup and one for complete release. This simplifies the structure of the hydraulic control circuit and also makes it possible to efficiently utilize the linear solenoid SL3 (solenoid valve) even when no gearshift is in progress.

Figure 4:
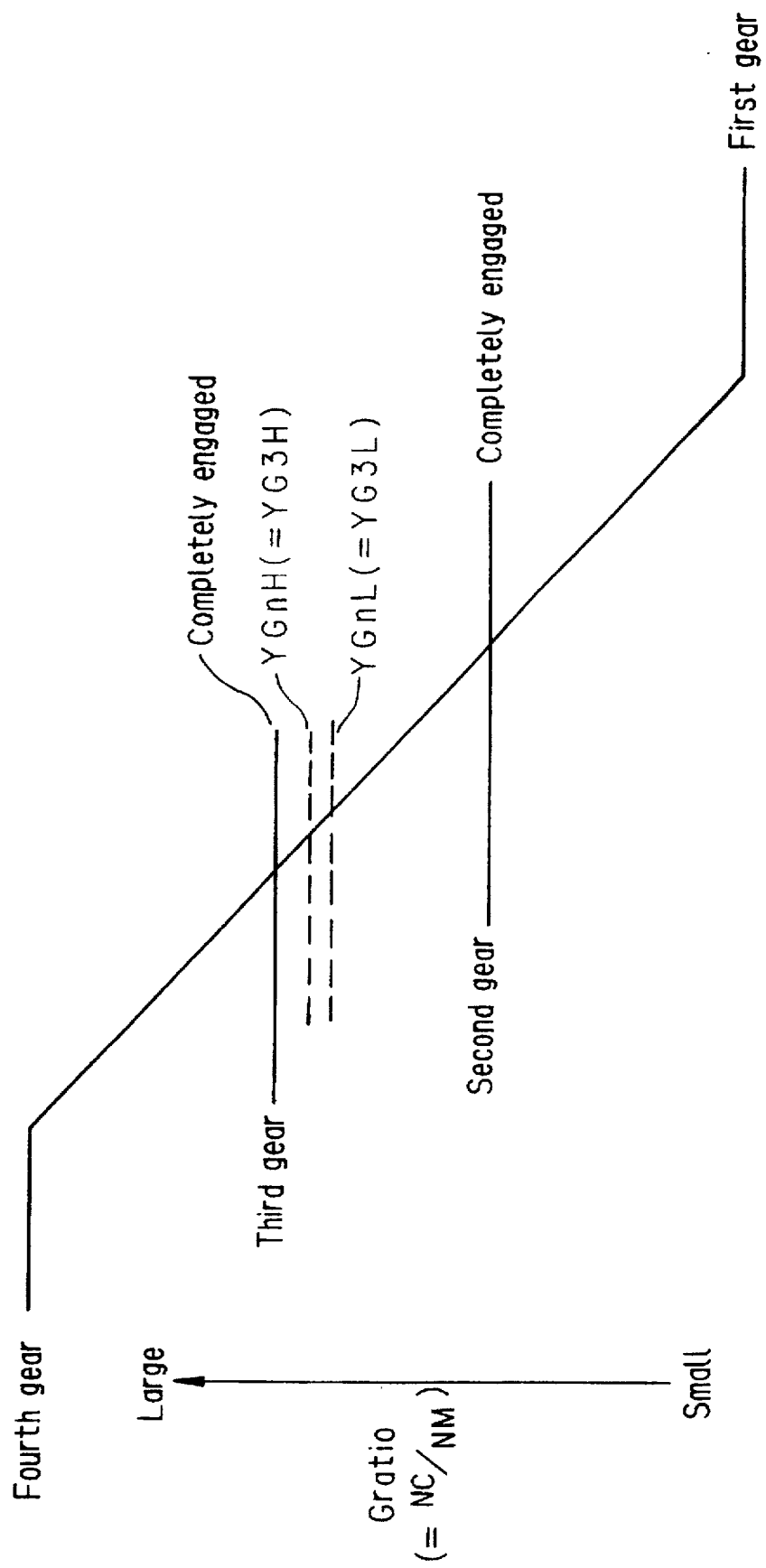
FIG. 4 is an explanatory view showing the procedures of the flowchart of FIG. 3.

As shown in FIG. 4, therefore, the control according to this invention starts after completion of gearshift and gradually reduces the value QJUA (the control value applied to the linear solenoid SL3 and equivalent to the oil pressure supplied to the currently engaged clutch) such that it slips. The amount of slip is defined as the rotational speed ratio:

Gratio=Output shaft rotational speed NC/Input shaft rotational speed NM.

In this slip control, the value QJUA which corresponds to the supplied oil pressure is made large at first and then gradually decreased. At the time point when the amount of slip is detected to have fallen below a prescribed value YGnL (see FIG. 4), it is returned in the increase direction (to compensate for the oil pressure response delay) and then controlled to a prescribed amount of slip, namely, to within a prescribed rotational speed ratio range. More specifically, when the rotational speed ratio Gratio is found to have fallen below the prescribed value YGnL, it is once corrected in the increase direction, and then controlled using PI control law to bring the detected rotational speed ratio Gratio between prescribed values (upper and lower limit values) YGnH,L.

The explanation of the flowchart of FIG. 3 will now be continued. When S10 finds that the current routine cycle (program loop) is not the first cycle following completion of a gearshift, the program goes to S18, in which it is checked whether a second flag F.TM1 is set to 1. Since this flag is initially reset to 0, the result in S18 is NO at this point and the program goes to S20, in which a timer (down counter) TM1 is started, and to S22, in which the flag F.TM1 is set to 1 as an indication that the timer TM1 was started.

The program then goes to S24, in which it is checked whether the value of the timer TM1 has reached 0. Since the timer was just started in S22, the result is NO and the program goes to S26, in which a value QG is set to a relatively large prescribed value YQGA. QG is a correction amount for reducing the clutch oil pressure and is varied as a function of the throttle opening. In the next and following routine cycles, the result in S18 becomes YES and the program goes directly to S24. When S24 finds that the value of the timer TM1 has reached 0, the program goes to S28, in which the correction amount QG is set to a different prescribed value YQGB, which represents a correction amount satisfying the relationship:

YQGA>YQGB.

In other words, for conducting the slip control as rapidly as possible, the clutch oil pressure is first rapidly lowered to the value equivalent to the torque capacity of the clutch about 1.2 times the engine torque (QET×1.2), is then reduced to a relatively low level within the prescribed time period TM1 after completion of the gearshift, and is thereafter reduced gradually.

The program then goes to S30, in which it is checked whether the flag F.GST is set to 1. Since this flag was set in S14, the result here is YES and the program goes to S32, in which it is checked whether the calculated rotational speed ratio Gratio is below the prescribed value YGnL, i.e., whether the clutch Cn engaged during gearshift has begun to slip. When the result in S32 is NO, the program goes to S34, in which the value QJUA is subtracted by the correction amount QG obtained in S26 or S28, and to S16, in which the control value QJUA is corrected as shown in the figure.

On the other hand, in the next and following routine cycles, when S32 finds that the rotational speed ratio Gratio is below the prescribed value YGnL, i.e., that the clutch Cn has begun to slip, the program goes to S36, in which a second timer (down counter) TM2 is started (set), and to S38, in which the value QJUA is corrected (increased) by adding thereto the product of the correction amount QG and a coefficient k. This is to correct for a delay in the detection of the input/output rotational speeds NM, NC serving as the basis for the gear ratio calculation which can be expected owing to the slow action of the oil pressure.

The program then goes to S40, in which the flag F.GST is reset to 0, and to S42, in which it is checked whether the value of the timer TM2 has reached 0. Since the timer was just started in S36 in this cycle, the result is NO and the program goes to S16, in which the control value QJUA is determined as shown.

On the other hand, in the next and following routine cycles, the result in S30 is NO and the program jumps to S42, in which it is checked whether the value of the timer TM2 has reached 0. So long as the result in S42 is NO, the program goes to S16. When it is YES, the program goes to S44, in which it is checked whether the calculated rotational speed ratio Gratio is greater than the prescribed value (upper limit value) YGnH. When the result in S44 is YES, the program goes to S46, in which PI control law is used to calculate the PI correction term QPI from the control error between the calculated rotational speed ratio Gratio and the value YGnH.

On the other hand, when the result in S44 is NO the program goes to S48, in which it is checked whether the rotational speed ratio Gratio is at or below the prescribed value (lower limit value) YGnL. When the result in S48 is YES, the program goes to S50, in which PI control law is used to calculate the PI correction term QPI from the control error between the calculated rotational speed ratio Gratio and the value YGnL.

The program then goes to S16, in which the control value (manipulated variable) QJUA is corrected as shown. Naturally, when the result in S48 is NO, the program goes directly to S16.

While the prescribed values YGnH, L vary with the gear as shown in FIG. 4, the processing of S44 to S50 amounts to using PI control law to bring the rotational speed ratio Gratio into the range defined by the upper and lower limit values YGnH, L. The shift to PI control when S42 finds that the prescribed time period TM2 has passed is for stabilizing the action of the oil pressure, which, as pointed out earlier, involves a response delay.

As explained in the foregoing, this embodiment conducts slip control of the engaged clutch even when gearshift is not in progress (in other words, no gearshift command is output). As a result, surging can be absorbed without degrading drivability even when the lockup clutch is completely locked up. Moreover, since the slip control of the clutch is conducted through the linear solenoid SL3, the linear solenoid SL3 can be effectively utilized even when gearshift is not in progress.

Since surging can be absorbed even when the lockup clutch is completely locked up, it suffices to control the lockup clutch between two positions, one for complete lockup and one for complete release. In other words, no need arises to absorb surging by controlling the lockup clutch in a slip state between the completely locked up and completely released states. The structure of the hydraulic control circuit can therefore be simplified, with a corresponding decrease in weight.

This will be better understood from FIG. 2, which shows the additional components required by the hydraulic control circuit when the invention is not adopted. Specifically, as shown by the phantom lines in this figure, it becomes necessary to provide an L/C control valve, an L/C timing valve and a duty solenoid SL5 for L/C slip control and to control the slip (engaging force) of the lockup clutch by adjusting the oil pressure supplied to the left and right chambers of the lockup clutch based on the modulator pressure or the throttle pressure. Since this control is unnecessary in the embodiment, however, the L/C control valve, L/C timing valve and the duty solenoid SL5 for L/C slip control are unnecessary. This is indicated in FIGS. 2 and 1 by representing them in phantom lines.

Although the invention has thus been shown and described with reference to specific embodiments, it should be noted that the invention is in no way limited to the details of the described arrangements, changes and modifications may be made without departing from the scope of the invention, which is defined by the appended claims.

What is claimed is:

1. A system for controlling a hydraulically operated vehicle transmission, comprising:

vehicle operating condition detecting means for detecting parameters indicative of operating conditions of the vehicle;

gearshift command output means for determining a gear ratio to be shifted to based on the detected parameters, to output a gear shifting command;

a plurality of frictional engaging elements for selectively establishing one gear shift in the transmission; and hydraulic pressure regulating means for regulating a supply of hydraulic pressure to said frictional engaging elements;

wherein said hydraulic pressure regulating means includes:

discriminating means for discriminating whether the gear has been shifted to said gear ratio; and slip control means for controlling at least one of said frictional engaging elements in a slipping state when the gear has been shifted to said gear ratio.

2. A system for controlling a hydraulically operated vehicle transmission, comprising:

a hydraulic torque converter having an input connected to an internal combustion engine mounted on the vehicle and an output connected to the transmission, and passing engine power to the transmission;

lockup means for controlling the input and the output of the hydraulic torque converter to an engaged state or a disengaged state;

vehicle operating condition detecting means for detecting parameters indicative of operating conditions of the vehicle;

gearshift command output means for determining a gear ratio to be shifted to based on the detected parameters, to output a gearshift command;

a plurality of frictional engaging elements for selectively establishing one gear stage in the transmission; and hydraulic pressure regulating means for regulating a supply of hydraulic pressure to said frictional engaging elements;

wherein said hydraulic pressure regulating means includes:

discriminating means for discriminating whether the gear has been shifted to said gear ratio; and slip control means for controlling at least one of said frictional engaging elements in a slipping state if the lockup means directly connects the input and the output of the hydraulic torque converter when the gear has been shifted to said gear ratio.

3. A system according to claim 1, wherein said slip control means controls the frictional engaging element in a slip state such that a ratio between an output shaft rotational speed and an input shaft rotational speed of the transmission is a predetermined value.

4. A system according to claim 3, wherein said slip control means controls the frictional engaging element such that the hydraulic pressure to be supplied to the frictional engaging element is decreased to the slip state such that the ratio is within a predetermined range.

5. A system according to claim 2, wherein said slip control means controls the frictional engaging element in a slip state such that a ratio between an output shaft rotational speed and an input shaft rotational speed of the transmission is a predetermined value.

6. A system according to claim 5, wherein said slip control means controls the frictional engaging element such that the hydraulic pressure to be supplied to the frictional engaging element is decreased to the slip state such that the ratio is within a predetermined range.

* * * * *